(12) United States Patent
Fornberg et al.

(10) Patent No.: US 12,470,361 B2
(45) Date of Patent: Nov. 11, 2025

(54) ACTIVE STATE POWER OPTIMIZATION FOR HIGH-SPEED SERIAL INPUT/OUTPUT INTERFACES

(71) Applicant: Intel Corporation, Santa Clara, CA (US)

(72) Inventors: Per E. Fornberg, Portland, OR (US); Anoop Karunan, Bangalore (IN); Aruna Kumar L S, Bangalore (IN); Sunil Kumar CR, Bangalore (IN); Sleiman Bou-Sleiman, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 17/690,339

(22) Filed: Mar. 9, 2022

(65) Prior Publication Data

US 2022/0200780 A1  Jun. 23, 2022

(51) Int. Cl.
*H04L 7/00* (2006.01)
*G06F 1/26* (2006.01)
*G06F 13/42* (2006.01)

(52) U.S. Cl.
CPC .............. *H04L 7/0091* (2013.01); *G06F 1/26* (2013.01); *G06F 13/4282* (2013.01); *H04L 7/0008* (2013.01); *H04L 7/0079* (2013.01)

(58) Field of Classification Search
CPC ... H04L 7/0008; H04L 7/0079; H04L 7/0091; G06F 1/26; G06F 13/4282
See application file for complete search history.

(56) References Cited

U.S. PATENT DOCUMENTS

| | | | |
|---|---|---|---|
| 6,359,423 B1* | 3/2002 | Noro | H02J 3/12 323/208 |
| 2003/0022686 A1* | 1/2003 | Soomro | H04L 1/0028 455/522 |
| 2013/0311792 A1* | 11/2013 | Ponnathota | G06F 1/26 713/300 |
| 2014/0119137 A1* | 5/2014 | Mozak | G11C 11/4093 365/189.09 |
| 2015/0085187 A1 | 3/2015 | Chen et al. | |
| 2015/0092065 A1 | 4/2015 | Radhakrishnan et al. | |
| 2015/0194083 A1* | 7/2015 | Sinha | G09G 5/395 345/212 |
| 2019/0012981 A1 | 1/2019 | S et al. | |

* cited by examiner

*Primary Examiner* — David B Lugo
(74) *Attorney, Agent, or Firm* — Alliance IP, LLC

(57) ABSTRACT

A system comprising transmission circuitry to communicate first data to receiver circuitry over a serial communication link during an active state of the serial communication link; and power adjustment circuitry to adjust a power level of the transmission circuitry responsive to a request based on at least one margin measurement performed by the receiver circuitry on the first data, wherein the transmission circuitry is to communicate second data using the adjusted power level over the serial communication link.

20 Claims, 13 Drawing Sheets

| Differential Swing (mV) | Equivalent Impedance (Ohms) |
|---|---|
| 400 | 240 |
| 600 | 160 |
| 800 | 80 |
| 1000 | 50 |

| Routing Length Power Savings | Max | Max – 0.5" | Max – 1" | Max – 1.5" |
|---|---|---|---|---|
| Pessimistic Case | 0% | 12% | 21% | 29% |
| Typical Case | 17% | 26% | 34% | 41% |
| Optimistic Case | 29% | 38% | 44% | 50% |

FIG. 10
| Tests<br>All power numbers in mW | Default<br>Ron 50 | A<br>Ron 80 | B<br>Ron 150 | C<br>Ron 240 |
|---|---|---|---|---|
| Total Power | 160.97 | 90.60 | 85.77 | 19.47 |
| % Saving | 0.00 | 10.36% | 15.05% | 22.28% |
FIG. 11
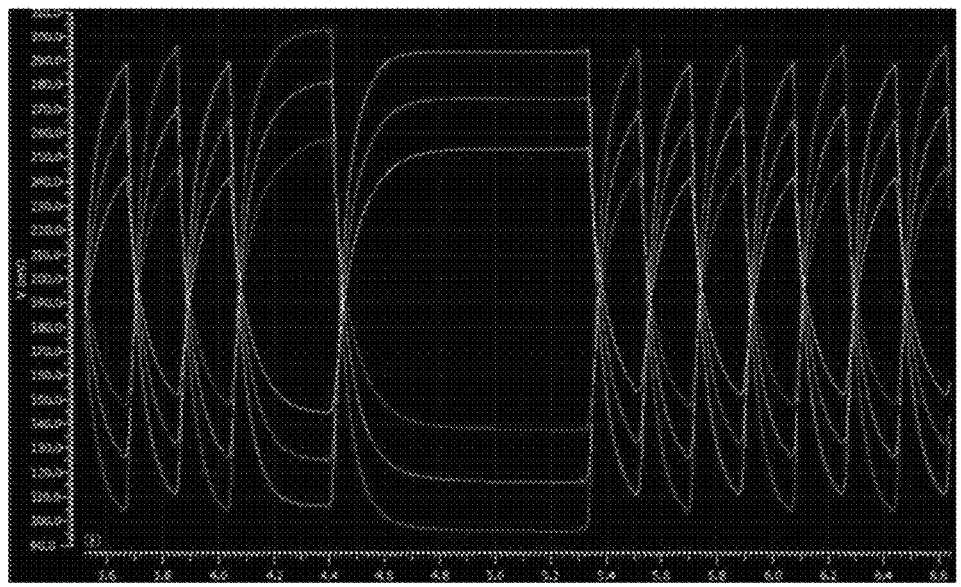
FIG. 12
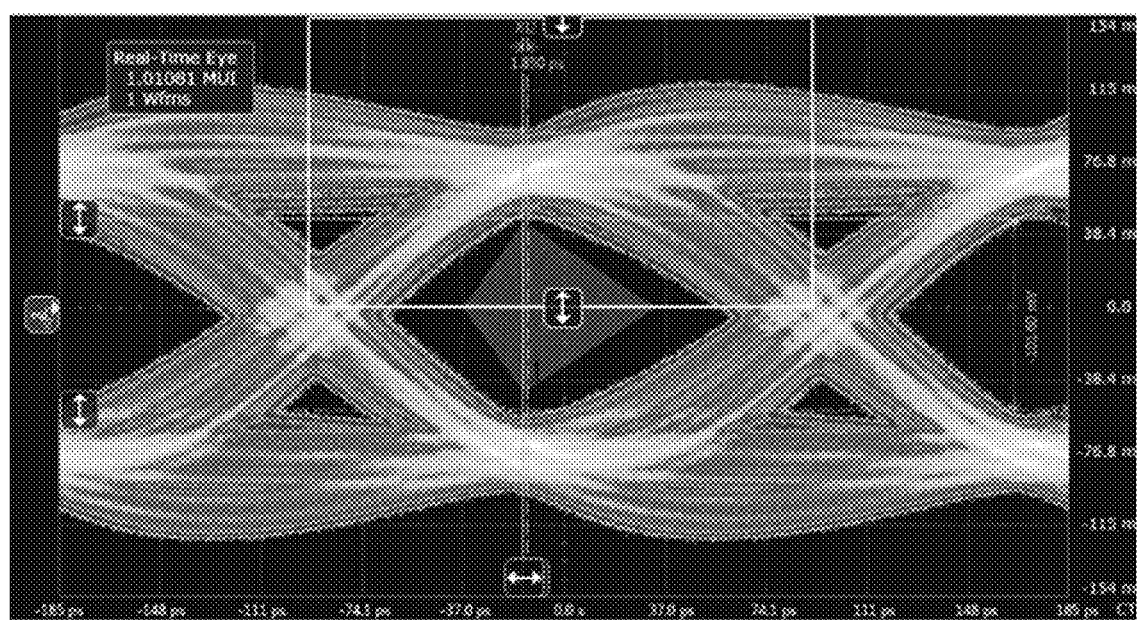

ACTIVE STATE POWER OPTIMIZATION FOR HIGH-SPEED SERIAL INPUT/OUTPUT INTERFACES

BACKGROUND

A computing system may comprise a transmitter to communicate with a receiver using one or more high-speed I/O lanes. The data communicated on a lane may have a margin at the receiver, which may be defined in terms of timing, voltage, and/or bit error rate.

BRIEF DESCRIPTION OF THE DRAWINGS

FIG. 10 illustrates power savings as a function of termination resistance in accordance with various embodiments.

FIG. 11 illustrates waveforms for different termination resistances in accordance with various embodiments.

FIG. 12 illustrates an eye diagram for an example transmitter in accordance with various embodiments.

Like reference numbers and designations in the various drawings indicate like elements.

DETAILED DESCRIPTION

Figure 1:
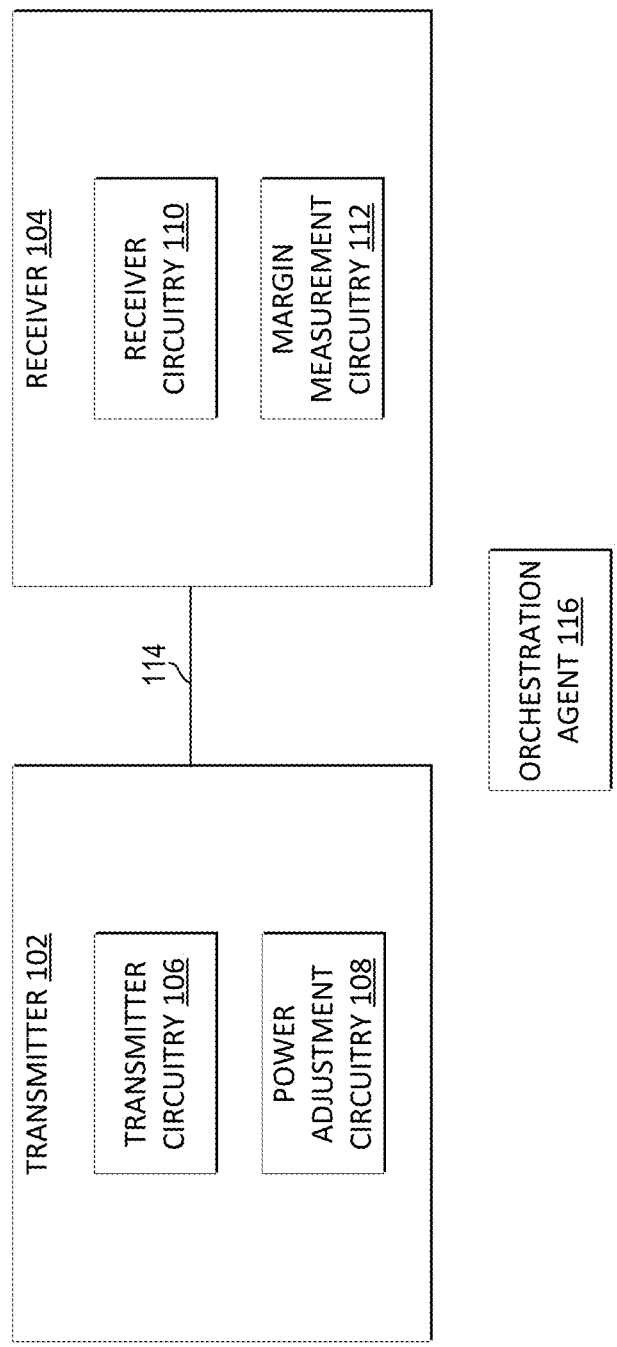
FIG. 1 illustrates a computing system implementing active state power optimization in accordance with certain embodiments.

FIG. 1 illustrates a computing system 100 implementing active state power optimization in accordance with certain embodiments. System 100 comprises a transmitter 102 and receiver 104 coupled via link 114. The transmitter 102 comprises transmitter circuitry 106 and power adjustment circuitry 108. The receiver 104 comprises receiver circuitry 110 and margin measurement circuitry 112. The system 100 also comprises orchestration agent 116 to facilitate active state power optimization.

High-speed serial input/output (I/O) interfaces coupling transmitters and receivers, such as, e.g., Universal Serial Bus (USB) Type-C, Peripheral Component Interconnect (PCI) Express, and Display Port (DP) are ubiquitous on modern mobile computing devices including tablets, laptops and virtual reality (VR)/augmented reality (AR) gear. A key performance metric for such devices is hours of battery life (HOBL), as these mobile devices will often be powered by a battery. In these devices, the high-speed I/O consumes a considerable portion of the overall platform power.

Current high-speed serial I/O interfaces generally operate with fixed transmit power levels. As a result, the designs must be sufficient to meet worst-case conditions arising from manufacturing variations (e.g., slow to fast corner) and noise coupling. Accordingly, most of the systems deployed are over-designed and operate with excess electrical margin. The extra margin can result in excessive consumption of power.

Various embodiments of the present disclosure may adapt the power utilized by the I/O interface based on electrical margin measurements (e.g., eye height and eye width parameters) performed by margin measurement circuitry 112 of the receiver 104. System 100 may implement a practical power-adaptive digital interface that will minimize power consumption for the given channel and noise conditions. The system 100 may adjust the transmit power of the transmitter circuitry 106 in such a way that the receiver 104 closely meets the target eye height and eye width margins. If the receiver 104 has an excess margin, the transmit power may be decreased. Conversely, if the margin is too low, the transmit power may be increased. Thus, the system 100 may adapt power usage to dynamically changing conditions (e.g., due to noise and crosstalk) at a fine granularity (e.g., more than two power settings) to achieve better power efficiency.

In various embodiments, system 100 may utilize an iterative power adaptation scheme during active operation that relies on margin measurements performed, e.g., at the host and endpoint receivers (e.g., the transmit power of communications from the host to the endpoint may be optimized based on margin measurements at the endpoint and/or the transmit power of communications from the endpoint to the host may be optimized based on margin measurements at the host). The power adjustments may be made after an interface goes through its initial training sequence and is in an active operational state. Thus, the margin measurements may be performed on actual data passing from the transmitter 102 to receiver 104 during an active operational state (as opposed, e.g., to training data sent during a training sequence).

While the interface is in active operation, certain conditions can change and affect the margins. For example, when a neighboring interface in the system turns on and off, crosstalk and power noise coupling from the neighboring interface may change. Radio-frequency interference effects from the environment may also change dynamically. Orchestration agent 116 may be implemented on the transmitter 102, on the receiver 104, on another computing entity (e.g., a device comprising the transmitter 102 or receiver 104), or distributed among any of these. The orchestration agent 116 may be implemented by any suitable circuitry and in some embodiments may be implemented at least in part by software (e.g., firmware or other instructions) executed by a controller or other processor. The orchestration agent 116 may orchestrate the power reduction method by initiating periodic margin measurements during the active operation of the interface and making decisions to adjust the transmit power when appropriate. In various embodiments, these adjustments to the transmit power control variable may be relatively small, without modifying the equalization settings.

In some embodiments, the metrics used to optimize the power of the I/O interface may be obtained by margin testing capabilities of the receiver 104 that are required by a published I/O standard defined for the type of the I/O interface (e.g., USB Type-C, PCI Express, Display Port, etc.). Thus, standardized margining capabilities (e.g., based on a published I/O specification) for host and endpoint receivers may enable power optimization for both Tx and Rx lanes of link 114 when the host is connected to an endpoint device that is compliant with the specification. Various embodiments may utilize system margins such as margin to an error rate target or eye height and/or eye width parameters using a training mechanism defined in an I/O specification as well as side band communications to adjust the transmission power.

Various embodiments may provide one or more technical advantages, such as utilizing the excess margin of an I/O link to reduce power consumption, improving HOBL, controlling the receive margin to maintain an appropriate bit error rate, and reducing cost for taking design or validation risks (as even a poorly designed end-to-end system may function properly at the desired speed and bit error rate).

Figure 2:
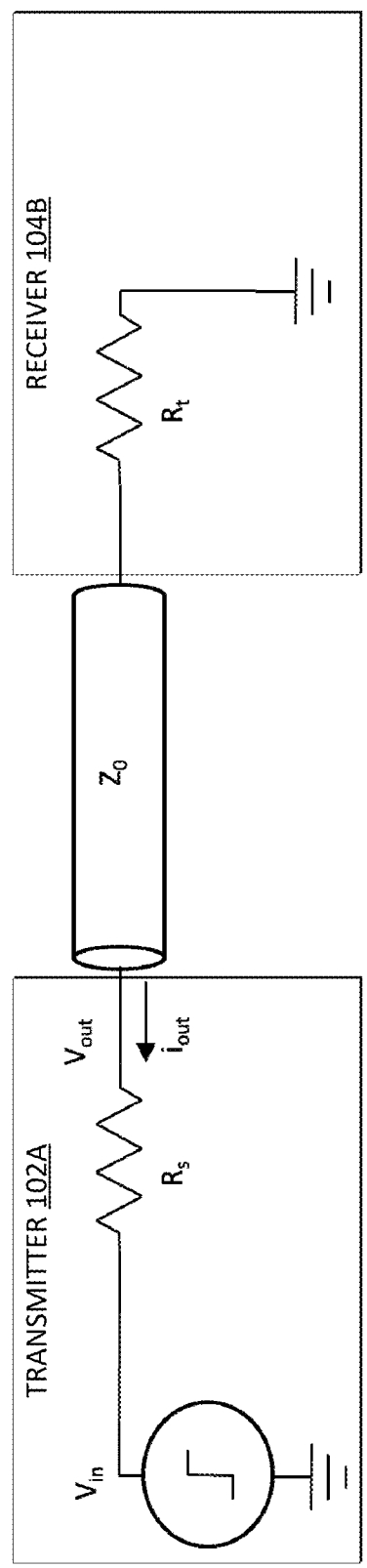
FIG. 2 illustrates a simplified linear model for a voltage-mode transmitter for use in a computing system implementing active state power optimization in accordance with certain embodiments.

FIG. 2 illustrates a simplified linear model for a voltage-mode transmitter 102A for use in a computing system (e.g., 100) implementing active state power optimization in accordance with certain embodiments. Transmitter 102A may represent a generalized model implemented by transmitter 102 and receiver 104A may represent a generalized model implemented by receiver 104 of FIG. 1.

An ideal voltage supply for data transmissions may switch between zero (GND) and the driver voltage swing $V_{in}$. The voltage passes by a source termination impedance $R_s$, (e.g., an output impedance of a transmitter driver, also referred to herein as Ron, Rterm, or Rbuff) before being applied to the channel (e.g., link 114 as well as any other interconnect from the transmitter 102 to the receiver 104). During transient conditions, the output voltage $V_{out}$ is computed as a voltage divider between $R_s$ and the characteristic impedance of the transmission line ($Z_0$), with $V_{out}=V_{in}*Z_0/(R_s+Z_0)$. For steady-state conditions, the output voltage is the voltage divider between the source and termination impedance, with $V_{out}=V_{in}*R_t/(R_s+R_t)$. In either case, the current flowing $i_{out}$ is proportional to $V_{out}$, and the transmit power is proportional to $V_{out}^2$.

The transmit power may have a direct relation to the margin at the receiver 104B. By adjusting the transmit power of the transmitter 102A, the receive margin can be modified. The transmit power for transmitter 102A may be controlled by adjusting one or more parameters of the transmitter 102A. For example, one way to modify the transmit power is to adjust the driver voltage swing $V_{in}$, as the output voltage will be directly proportional to $V_{in}$. Another way to modify the transmit power is to adjust the source termination impedance $R_s$. Higher $R_s$ will reduce current and transmit power, and lower $R_s$ will increase the current and transmit power.

In various embodiments, $V_{in}$ and $R_s$ may be adjusted independently of each other, or with some interdependence. The range of variation supported may vary from design to design, with many transmitters having support for variations of at least +/−20% with respect to the nominal values (in other embodiments any suitable range of variation may be implemented). When the transmit power is adjusted based on margin measurements, either of $V_{in}$ or $R_s$ (or other parameter that affects the transmit power) may be modified, or both may be modified in combination. In various embodiments, a single transmit power control variable may control the actual transmit power monotonically over a range of interests. The translation of the transmit power control variable to power parameter values (e.g., $V_{in}$ and $R_s$) may be implementation specific.

In general, the power for a high-speed voltage-mode transmitter driver linearly increases with frequency and the number of the transmitter slices. This means for lower impedance, power used by the transmitter will be higher and for higher impedance, power used by the transmitter will be lower. In various embodiments a more power efficient I/O interface may be implemented by using margin metrics obtained while the link is in active operation.

Figure 3:
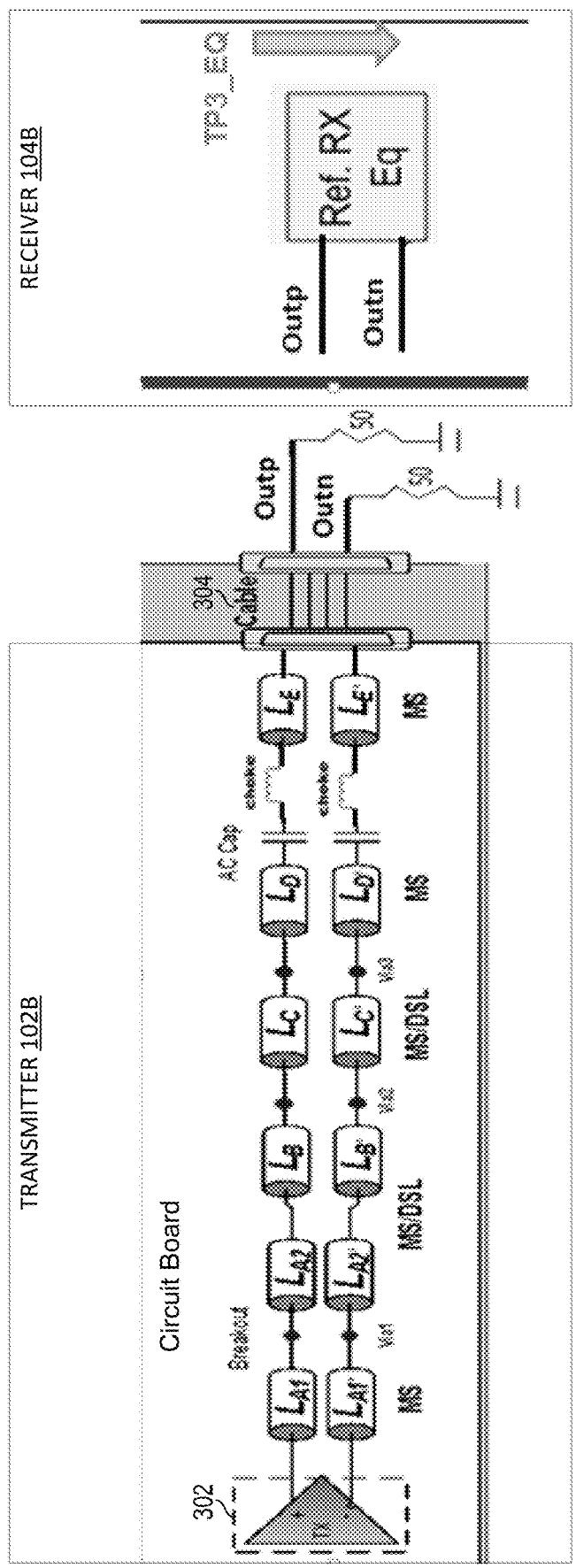
FIG. 3 illustrates a high-speed I/O topology for use in a computing system implementing active state power optimization in accordance with certain embodiments.

FIG. 3 illustrates a high-speed I/O topology for use in a computing system implementing active state power optimization in accordance with certain embodiments. Transmitter 102B may represent an alternative model that could be implemented by transmitter 102 and receiver 104B may represent an alternative model that could be implemented by receiver 104 of FIG. 1.

Transmitter 102B includes a transmitter driver 302 and various interconnect segments to couple the transmitter driver 302 to a cable 304 that couples the transmitter 102B to the receiver 104B.

High-Speed I/Os (HSIO) with a data rate above 1 Gbps are generally implemented as differential voltage-mode or current-mode transmitters. Voltage-mode transmitters are generally more power efficient. Most high-speed serial I/O specifications define the transmitter impedance (e.g., the output impedance of the Tx driver 302) to be 100 ohms differential (50 ohms single ended). The power equations for HSIOs are generally constrained by requirements that include data rate (e.g., >1 Gbps), supply voltage (e.g., ~1V), transmitter impedance (e.g., 100 ohms), and channel insertion loss (IL).

For embedded high-speed IO's like Embedded DisplayPort (eDP) and for external high speed I/Os like USB and DP, channel insertion loss can vary, e.g., from 12 dB to 30 dB. Relating this to the example topology of FIG. 3, the channel insertion loss for the main segments $L_B$ and $L_C$ (which may vary, e.g., from 1 to 5 inches) may contribute, e.g., 5 dB to 12 dB. The cable and connector together can contribute up to 18 dB, making the overall channel insertion loss variation to be within the range of 15 dB to 30 dB.

While general guidelines for platform integration provide static settings which work for worst case configurations, these settings are not power or performance optimal for many platform solutions. Various embodiments of the present disclosure adapt to the channels of different form factors and configure the transmitter to optimal power and performance settings specific to the channel used.

Figure 4:
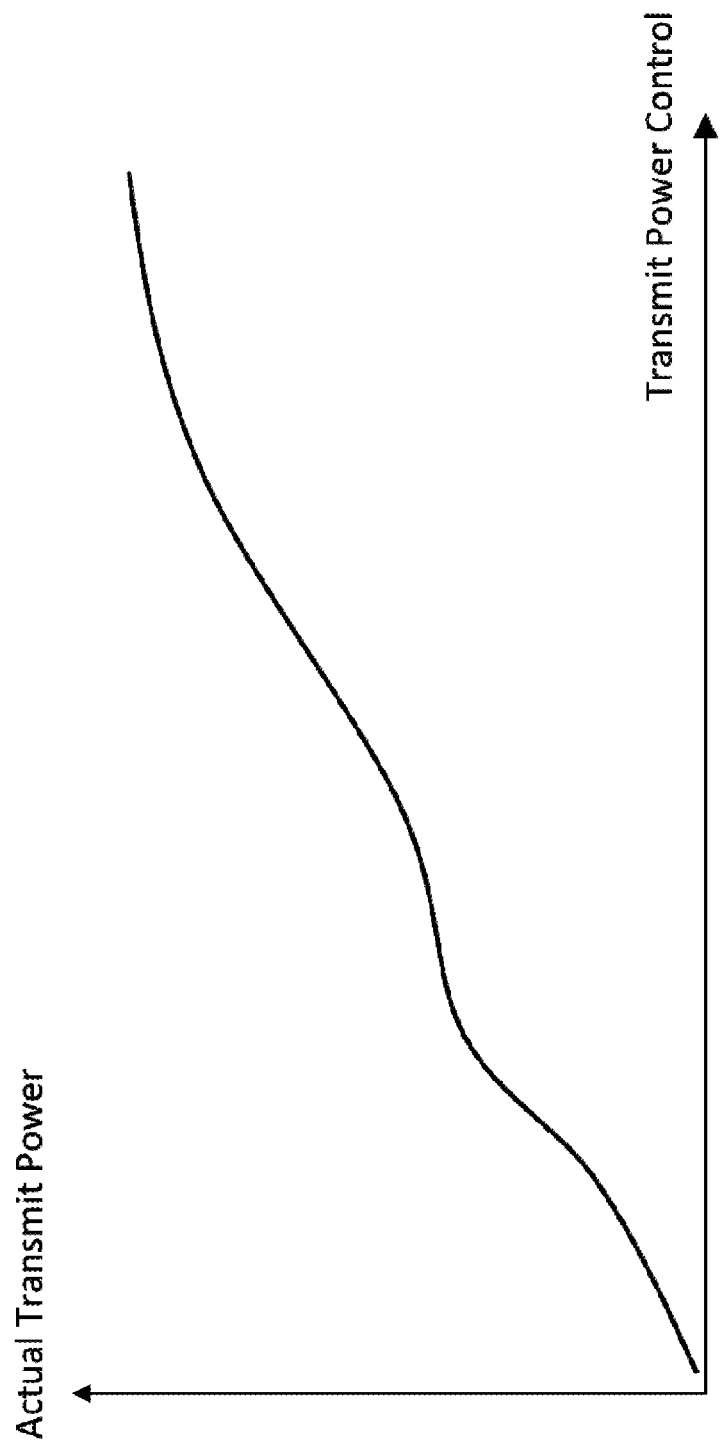
FIG. 4 illustrates a graph showing actual transmit power as a function of transmit power control settings in accordance with certain embodiments.

FIG. 4 illustrates a graph showing actual transmit power as a function of a transmit power control variable in accordance with certain embodiments. In this embodiment, the actual transmit power increases monotonically as a function of the transmit power control variable. A transmit power control variable may include, e.g., a setting for the swing voltage and/or a setting for the output impedance of the transmitter.

Figure 5:
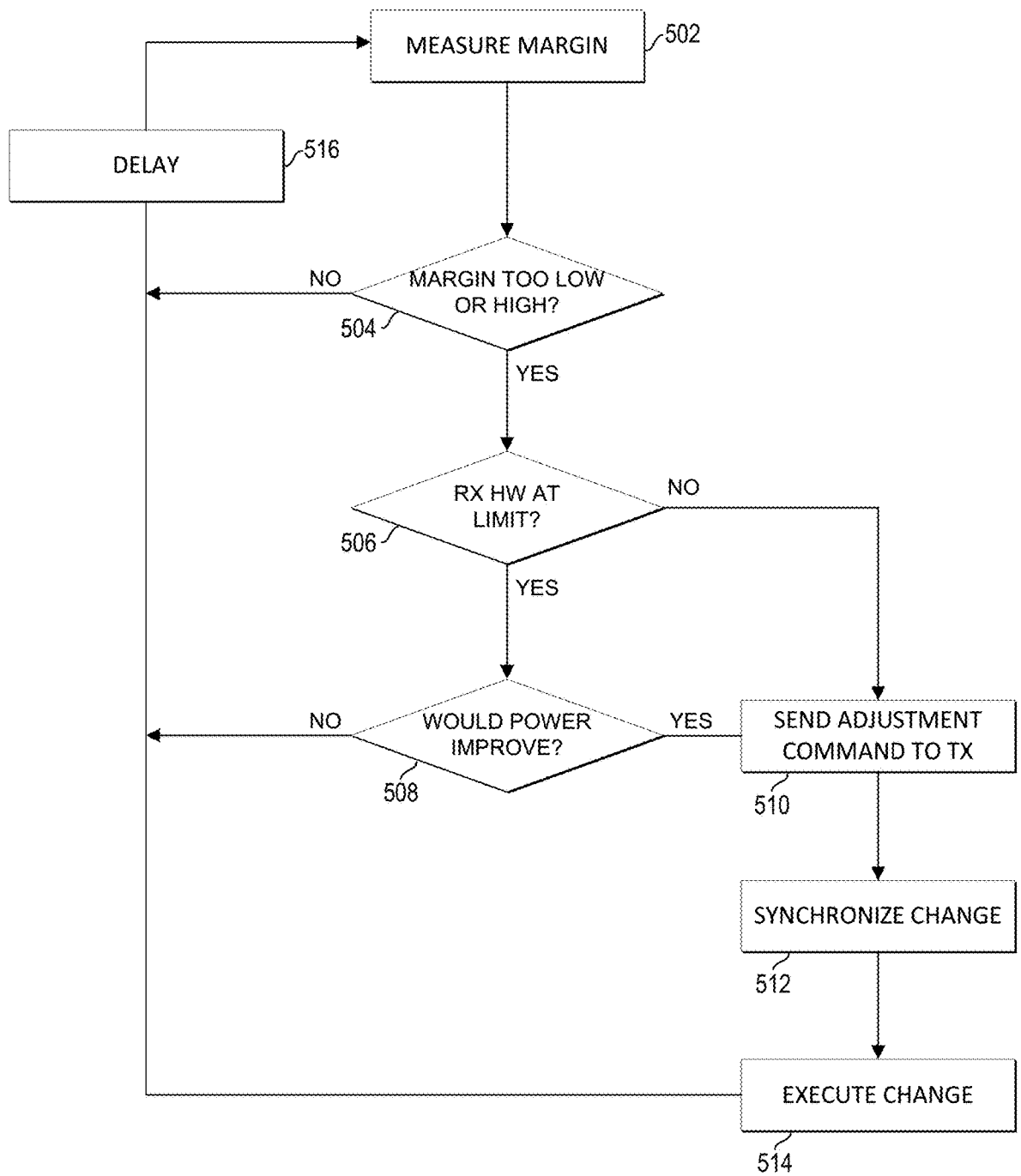
FIG. 5 illustrates a flow for performing active state power optimization in accordance with certain embodiments.

FIG. 5 illustrates a flow for performing active state power optimization in accordance with certain embodiments. During initial bring-up of a link (e.g., 114), a high-speed serial interface may go through a training process where specialized training patterns are transacted between the transmitter and receiver, and various sequences are performed to bring the link to the active operational state. Thus, in at least some embodiments, the active operational state in which the margin measurements are performed and the power is optimized may be entered after the link has been initialized and trained. In some embodiments, initialization and training may include a physical layer control process that configures and initializes a device's physical layer, port, and associated link so that normal packet traffic can proceed on the link during the active state of the link. Initialization and training may include one or more of detecting an endpoint, sending ordered sets, establishing lane polarity, negotiating a data rate, establishing bit and/or symbol lock, de-skewing lanes, configuring equalization settings, and performing clock/data recovery (CDR).

After the link goes through the initial training sequence, the transmitter 102 begins transmitting using default transmit power settings. Once the link is in the active state, the far end receiver (e.g., 104) will be margined at 502 using actual data sent from the transmitter to the receiver. If the margin measured is too high or too low, the transmit power is adjusted through changes in the transmit power control variable. The various operations of the flow of FIG. 5 represent an example flow for adjusting the transmit power based on the margin.

As described above, the margin of received data may be measured at 502 by a receiver (e.g., 104). In some embodiments, receiver lane margining capabilities required by a published I/O specification may be utilized to margin the interface. As various examples, interfaces for which the associated published I/O specifications specify required receiver lane margining requirements include PCIe Gen4 and later PCIe generations, USB4, and Display Port 2.1.

A I/O specification may specify any receiver lane margining requirements. For example, such requirements may include margining capabilities (e.g., whether the receiver supports measuring voltage and/or timing margins, the range of voltage or timing offsets that may be applied during margining, the step size of a voltage or timing offset) that are to be advertised by the receiver (and how an entity such as the orchestration agent 116 and/or transmitter 102 may obtain these capabilities), one or more register fields that may be used (e.g., by a software application) to perform a margin test (e.g., one or more registers to which voltage or timing offsets to be applied by the receiver may be written, one or more registers to specify a bit error ration contour to margin to, one or more registers to obtain test status information such as whether a test is in progress or has completed, one or more registers from which results of the margin test may be retrieved), the format used by the receiver to report the margin (e.g., the receiver may report a binary pass/fail indicator or may report the amount of margin available), how the receiver is to report the margin (e.g., via a sideband channel or through packets over the link being margined), or other suitable receiver lane margining requirements. Margin measurements may be performed using data samplers or using monitor/error samplers depending on the specific PHY implementation of the receiver. Margining using a monitor/error sampler (in which the received data path is duplicated so that data is received at a data sampler as well as a monitor/error sampler) may result in non-destructive margining as the margin measurement will not cause actual bit errors on the link, since the data path is unaltered as the data sampler will remain at the nominal sampling position (e.g., in terms of timing and voltage) whereas the sampling of the monitor/error sampler is adjusted to determine the available margin. Non-destructive margining may be advantageous in various embodiments as there is minimal risk of causing adverse performance impacts to the functionality of the link. Both the USB4 and DP2.1 specifications require that receivers support non-destructive voltage margining (and thus use a sampler for margining that is separate from the data sampler). At least some PCIe specifications may allow for destructive sampling.

The measurement of voltage margin may be obtained by applying known offsets to the reference voltage level for the comparator of the data sampler or monitor/error sampler. Similarly, the measurement of timing margin may be obtained by adding a phase offset to the sampling clock or by injecting known amounts of jitter. A combination of both voltage and timing margining may be used in some embodiments. The margin may be a function of the settings (e.g., voltage and/or timing) at which errors in the received data occur. For example, the voltage margin may be the amount of a voltage offset that may be applied to a sampler (relative to a nominal offset) at which a threshold number of errors are encountered (where the threshold may be zero or another number). Similarly, the timing margin may be the amount of a delay offset that may be applied to a sampler (relative to a nominal delay) at which a threshold number of errors are encountered (where the threshold may be zero or another number). Alternatively, the margin may be measured as a function of the bit error rate (e.g., margin to an error rate target). For example, an I/O specification may define a target bit error rate (e.g., for a particular bit rate). The I/O specification may also define the maximum time allowed to measure other bit error rates (e.g., bit error rates that are one or more orders of magnitude lower than the target bit error rate). The measured margin may be based on whether the target bit error rate is met or whether a target bit error rate that is lower (e.g., one or more orders of magnitude lower than the target bit error rate is met).

For I/Os which have a receiver lane margining requirement, the relevant I/O specification may require that a receiver support certain margining features, but may not dictate a specific design implementation. Thus, the acceptable level of margin may be specific to a particular design and application.

Figure 16:
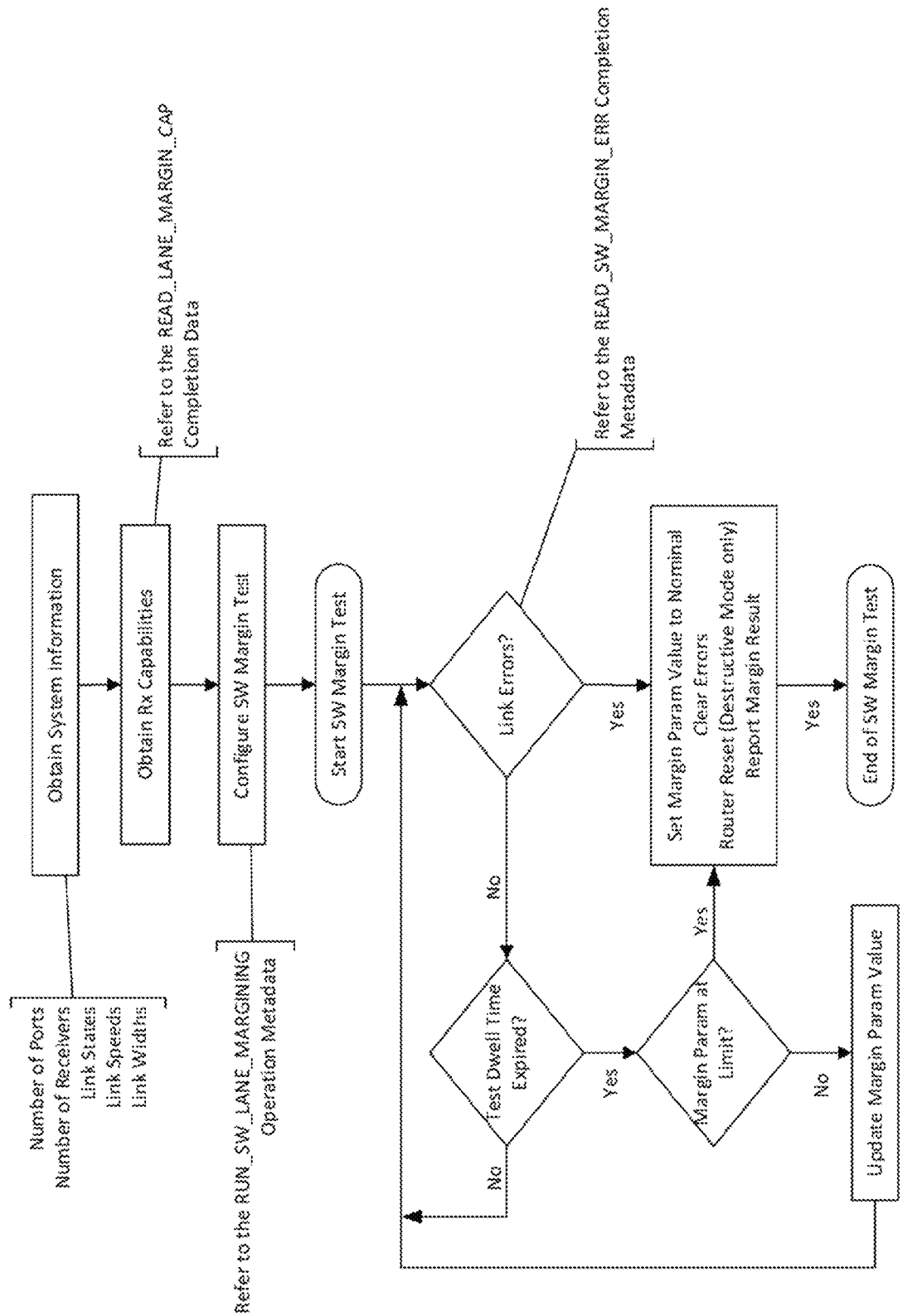
FIG. 16 includes an example margining flow for a hardware margining mode in accordance with certain embodiments.

In various embodiments, a software margining mode may enable the orchestration agent 116 (e.g., application software executing on the system under test) to obtain the margin information using a test flow that is implemented in software. In this mode, the orchestration agent 116 performs multiple read and write commands to implement the margining flow. FIG. 16 includes an example margining flow for a software margining mode according to certain embodiments. Any suitable operations of FIG. 16 (or other operations associated with measuring margin) may be performed at 502.

Figure 17:
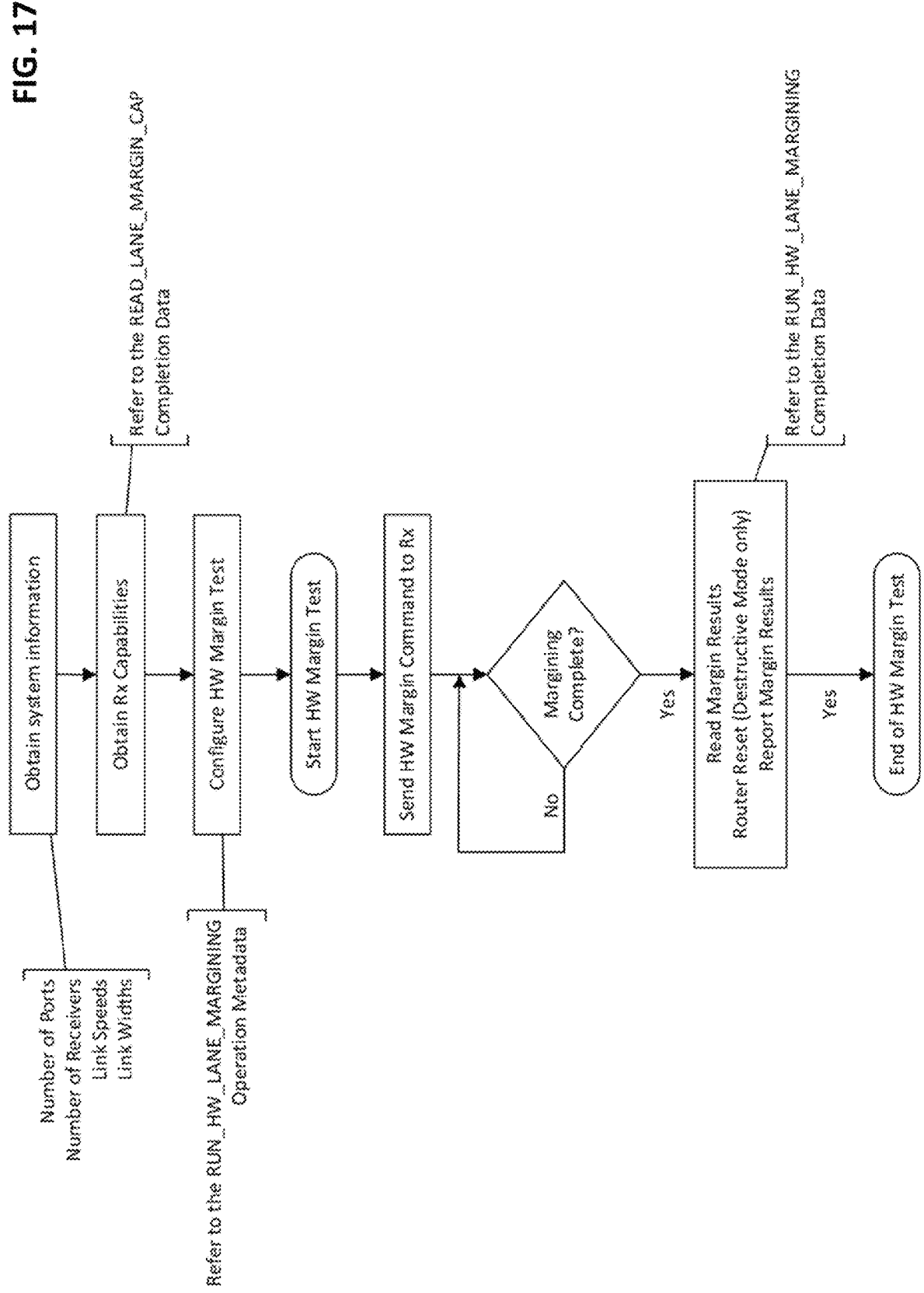
FIG. 17 includes an example margining flow for a hardware margining mode in accordance with certain embodiments.

In various embodiments, a hardware margining mode implements the margin test flow in hardware or firmware. In this mode, the orchestration agent 116 configures the test parameters and initiates a margining test by writing to configuration and command registers that are defined in the relevant I/O standard. The implementation of the margining flow is performed by hardware or firmware and the orchestration agent 116 obtains the margin results through the reading of status and result registers. FIG. 17 includes an example margining flow for a hardware margining mode according to certain embodiments. Any suitable operations of FIG. 17 (or other operations associated with measuring margin) may be performed at 502.

At 504, a determination is made as to whether the margin is too low or too high. If the margin is not too low or high (e.g., the margin is within a specified target range), the flow may move to 516 where a period of time passes before the margin is measured again at 502. If a determination is made that the margin is too low or too high at 504, then the flow moves to 506 where a determination is made as to whether hardware of the receiver is at a limit. For example, the agent (e.g., 116) orchestrating the power reduction method (or other suitable circuitry) may ascertain whether a transmitter power adjustment would cause the receiver to change its current mode of operation. When a receiver changes a mode of operation, the power consumed by the receiver may also change (e.g., due to additional circuitry such as an amplifier being turned on or off, a change in a gain setting, the boosting of a bias, etc.).

If the receiver hardware is at a limit, the flow may move to 508, where a determination as to whether system power would improve by adjusting the transmit power. For example, the expected change of power in the receiver (e.g., due to changing modes) may be compared against the change in transmit power to determine whether the overall power used to communicate over the link may be improved. If not, then the flow moves back to 502 after a period of delay at 516. This may allow the agent to avoid requesting further transmit power reductions when the savings would not offset the power consumed by additional circuitry in the receiver that would be turned on.

If the receiver hardware is not at a limit or is at a limit but an adjustment would improve overall power, the flow moves to 510. At 510, a power adjustment command is sent to the transmitter (e.g., to power adjustment circuitry 108). In one embodiment, the amount of the transmit power adjustment is proportional to the difference in the measured margin with respect to the target level. For example, if a large amount of extra margin is measured (e.g., a large voltage or timing margin is present and/or the bit error rate is one or more magnitudes lower than the target bit error rate), the amount of the transmit power adjustment during an iteration of the flow is larger than if a smaller amount of extra margin is measured. In this manner, the transmit power adjustments will be progressively smaller as the target margin is approached and the system will converge quickly to the optimal transmit power level (e.g., after a few iterations). In another embodiment, each adjustment command may adjust the transmit power up or down by a single step of the transmit power control variable. In this manner, all that needs to be conveyed to the transmitter is a simple ADJUST UP or ADJUST DOWN of the transmit power control variable. This operation can be repeated as many times as needed in additional iterations of the flow to achieve the desired target margin. In one embodiment, the granularity of the steps in the transmit power control variable may be on the order of 10 mV (that is, the adjustment of a single step may result in a change of roughly 10 mV in the swing voltage of the transmitter). Other embodiments may utilize any suitable granularity.

After the transmit power adjustment command is sent to the transmitter, the change may be synchronized at 512. For example, a time for the change may be specified and the transmitter and the receiver may be notified of this time. As one example, the change may take place at the beginning of the next data packet. The transmitter and receiver may both wait for the synchronization point and then execute the change at 514. Actions performed by the receiver to execute the change may depend on various factors, such as the receiver implementation and the data rate. In various embodiments, actions that preserve lock between the data and the clock may be favored. Retraining operations may include, for example, CDR phasing, DFE feedback scaling and/or retrain, or other suitable actions. In some embodiments, the receiver may freeze the CDR for a brief period while the adaptive equalization settles in response to the change. If the margin conditions change too substantially, then a full retrain of the interface may be required (in which case, transfer of actual data may pause while the link is retrained). The flow may resume again after the training is complete. After 514, the flow may return to 502 after a period of delay.

In various embodiments, the transmit power adjustment and margining may be performed independently for each lane on a link (e.g., if supported by the receiver lane margining capabilities and the transmitter configuration capabilities) or multiple lanes may be bundled and the transmit power adjustment and margining may be performed collectively for the lanes of the bundle.

Figures 6, 7:
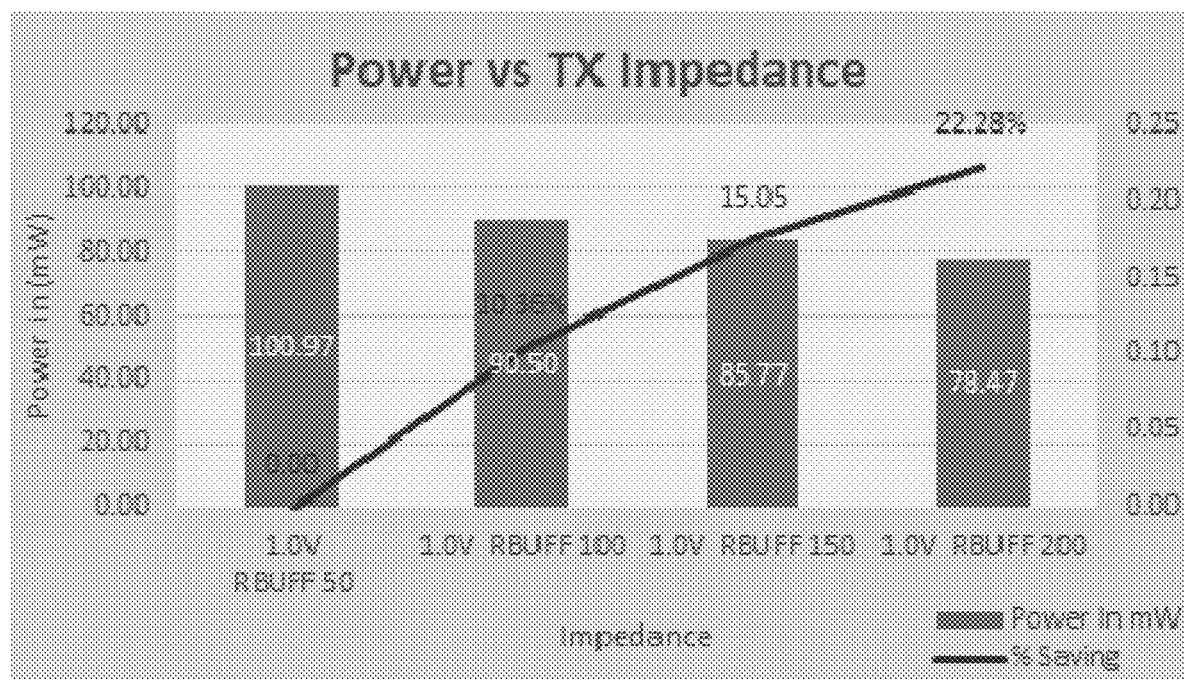
FIG. 6 illustrates a table showing a relationship between differential swing voltage and equivalent impedance in accordance with certain embodiments.
FIG. 7 illustrates power savings as a function of impedance in accordance with certain embodiments.

FIG. 6 illustrates a table showing a relationship between differential swing voltage and equivalent transmitter output impedance in accordance with certain embodiments. As depicted, as the equivalent output impedance of a transmitter decreases, the differential swing voltage of the output of the transmitter increases.

FIG. 7 illustrates power savings as a function of transmitter output impedance in accordance with certain embodiments. The graph illustrates metrics for an example voltage mode transmitter operating at 5.4 Gbps. The y-axis of the graph is the transmitter power and the x-axis includes various transmitter output impedances.

The power for voltage-mode transmitters may scale linearly with increases in the data rate and final swing requirements. The transmitter power can be reduced by increasing the transmitter output impedance within controlled limits (e.g., ~100 to 400 ohms differential) while still meeting voltage swing and Return Loss (RL) requirements for a given platform. As shown in FIG. 7, the transmitter power reduces as the output impedance increases. In some embodiments, the output impedance may be increased by decreasing the slice count of a transmitter, where a transmitter may include multiple independently controllable slices of resistive elements in parallel that may be used to obtain a lower impedance and slices may be selectively decoupled from the output of the transmitter in order to increase the impedance. FIG. 7 shows the power sensitivity for a typical voltage-mode driver for different transmitter output impedance configurations. In various embodiments, the transmitter output impedance may be configured within a specific range based on the platform parameters using a closed loop training algorithm (such as that explained above) to achieve an optimal balance between power and performance.

Figures 8, 9:
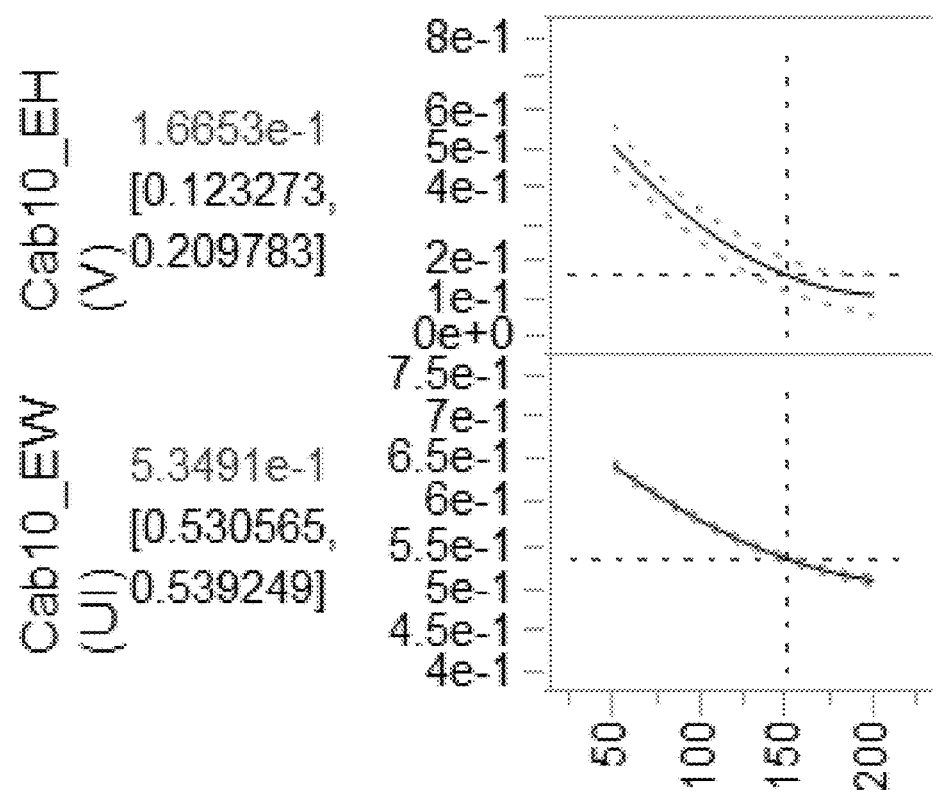
FIG. 8 illustrates margin as a function of termination resistance in accordance with various embodiments.
FIG. 9 illustrates power savings as a function of routing length in accordance with various embodiments.

FIG. 8 illustrates margin as a function of transmitter output impedance (also referred to as termination resistance or Rterm) in accordance with various embodiments. Design of experiments (DOE) carried out through signal integrity analysis shows that buffer resistance (referred to herein as Ron or Rterm) is a sensitive parameter in defining the margins for a given platform configuration. Buffer resistance also affects the power of the I/O interface. The prediction profiler results of FIG. 8 show the sensitivity of the Rterm to the eye height (EH) margin (indicative of voltage margin) and eye width margin (EW) margin (indicative of timing margin) for a DP topology at 5.4 Gbps where excess margin exists and allows for a solution space for optimizing power without violating the specification. Single ended Rterm from 50 ohms to 200 ohms was swept in the design of experiments to predict a practical solution space for DP/eDP protocols. This range can meet practical form factor requirements, thereby enabling significant power reduction. A topology can change from implementation to implementation, thus having a dynamic closed loop mechanism to control the Rterm based on the system margin (e.g., eye height and eye width) may achieve configuration of the optimal transmit power settings, even overcoming reflections.

FIG. 9 illustrates potential power savings for active state power optimization as a function of routing length in accordance with various embodiments. FIG. 9 is based on a simulation for USB and shows that even routing at the maximum length allowed, a typical system can achieve a power reduction of 17% and an optimistic system can achieve a 29% reduction while still meeting target margin levels. The savings are even greater when a design is not routed to the maximum length.

FIG. 10 illustrates potential power savings for active state power optimization as a function of transmitter termination impedance in accordance with various embodiments. FIG. 10 includes a summary of transmitter power for various transmitter output impedances (Ron) on a Display PHY for different transmitter impedance configurations from 50 ohms (default) to 240 ohms differential. Power savings of ~10%, ~15% and ~22% was measured with 80 ohms, 150 ohms & 240 ohms respectively. A power optimization algorithm that adapts to the platform and channel constraints (such as is described above) may realize the power savings noted in the table of FIG. 10 (or other suitable power savings).

FIG. 11 illustrates waveforms for different termination resistances in accordance with various embodiments. This FIG. shows that waveforms at an example transmitter pad for different termination resistance settings remain healthy as the swing amplitude changes as a function of the resistance.

FIG. 12 illustrates an eye diagram for an example transmitter in accordance with various embodiments. This depicts an eye diagram for a transmitter operating at 5.4 Gbps measured from post silicon for a channel with a termination resistance of 150 ohms and an overall IL of 14 dB. The area in the center is the eye, with the vertical axis representing voltage margin and the horizontal axis representing timing margin.

Figure 13:
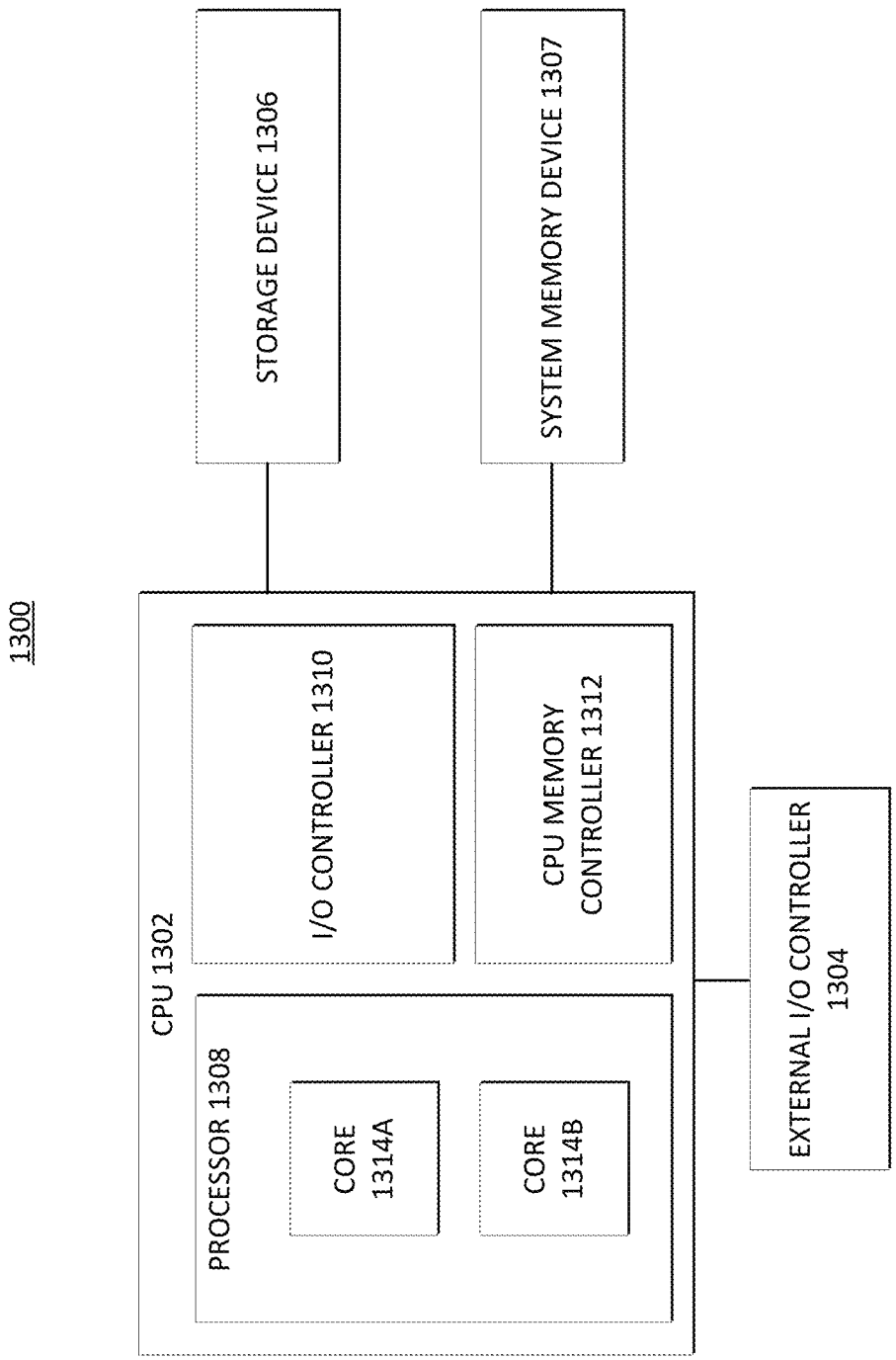
FIG. 13 illustrates components of a computer system in accordance with certain embodiments.
Figure 14:
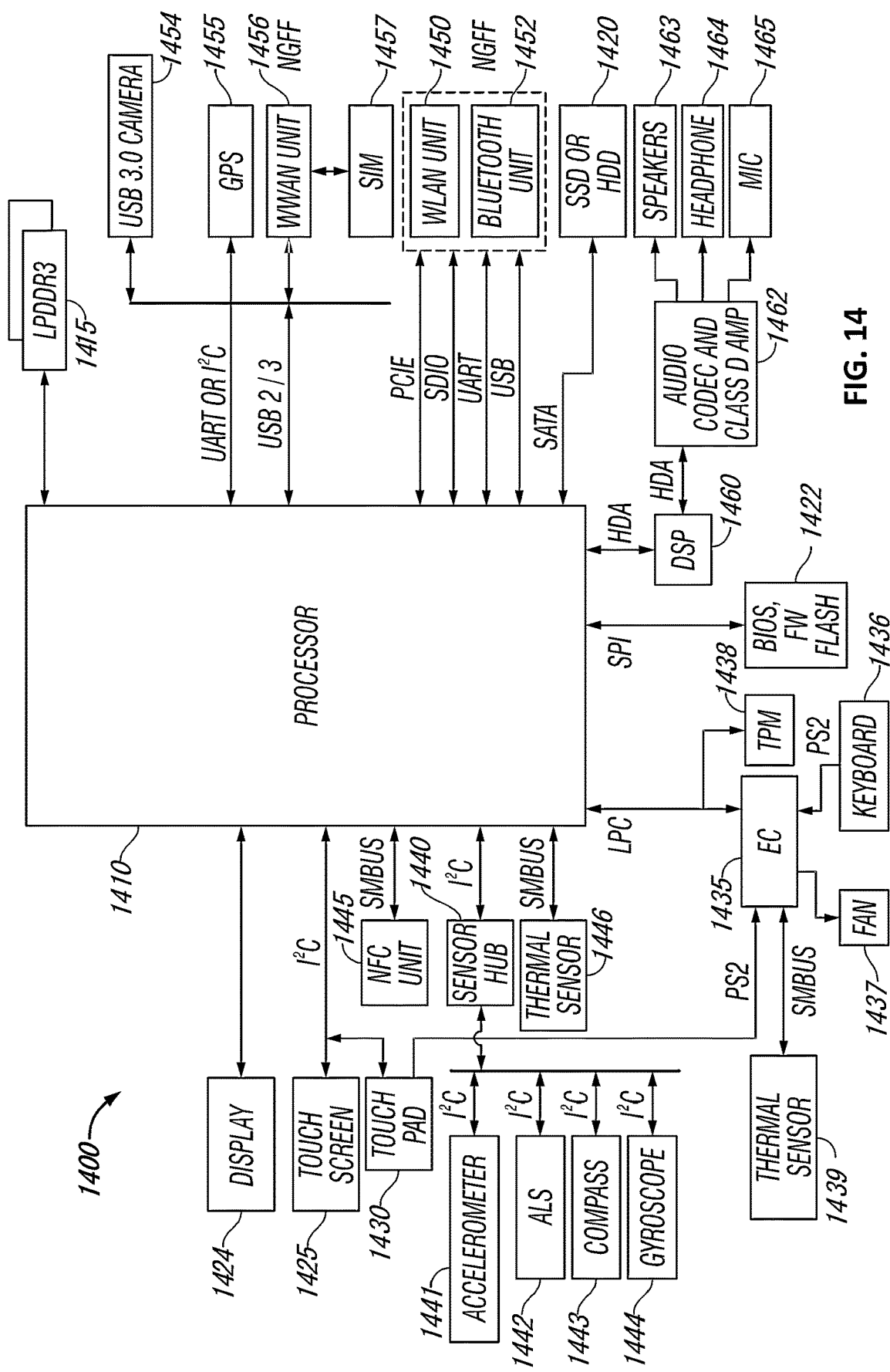
FIG. 14 illustrates a block diagram of components present in a computer system in accordance with certain embodiments.
Figure 15:
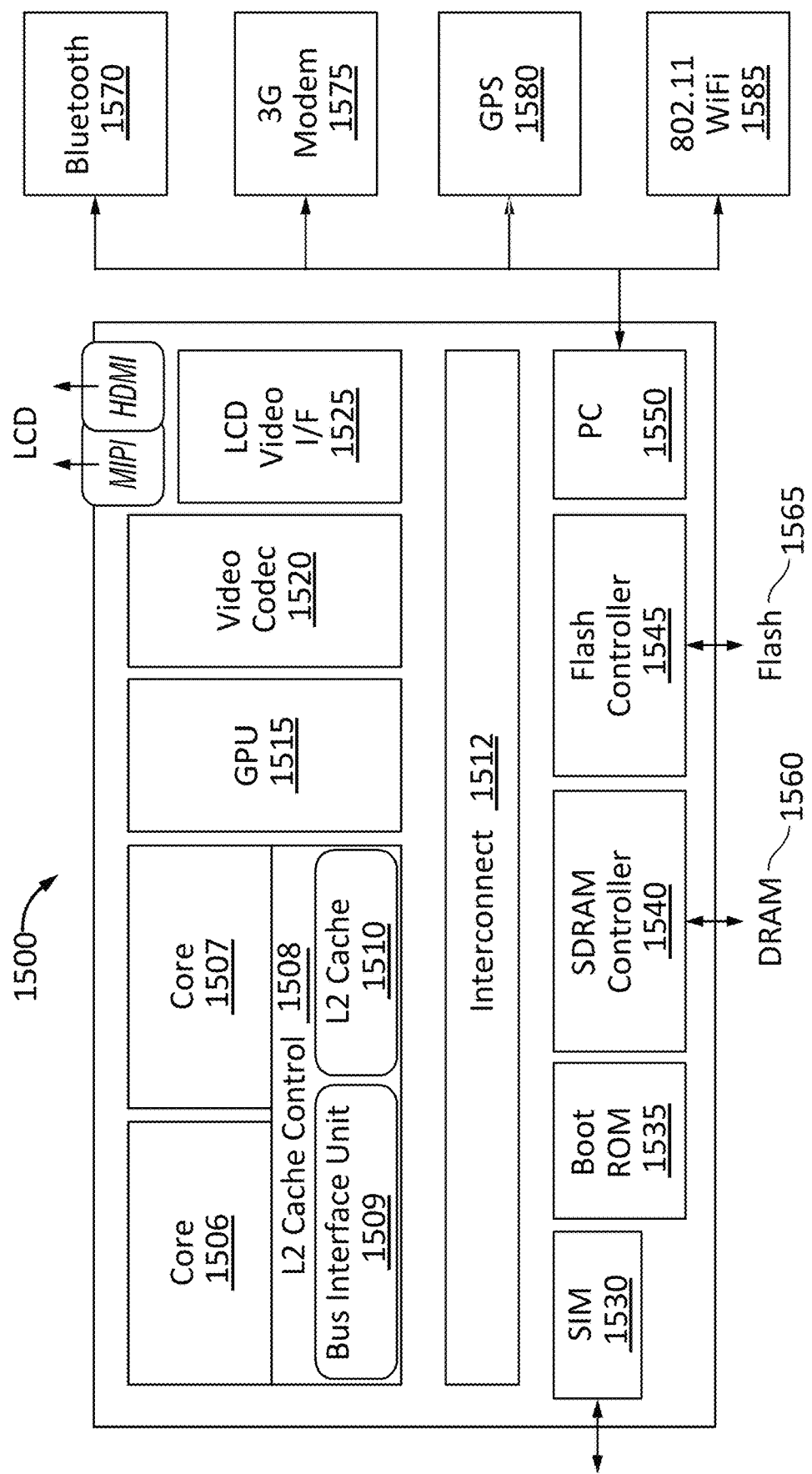
FIG. 15 illustrates a block diagram of an example computing system in accordance with certain embodiments.

FIGS. 13-15 depict example systems in which various embodiments described herein may be implemented. For example, any of the systems depicted (or one or more components thereof) may be included within system 100. For example, any of the systems depicted (or a component thereof) may include a transmitter 102, receiver 104, and/or orchestration agent 116. In some embodiments, a processor (e.g., 1308, 1410) or SoC (e.g., 1500) may comprise a transmitter 102 and a receiver 104 and a peripheral device may comprise a corresponding receiver 104 and transmitter 102 (as a device may operate as both a transmitter and receiver for a particular link).

FIG. 13 illustrates components of a computer system 1300 in accordance with certain embodiments. System 1300 includes a central processing unit (CPU) 1302 coupled to an external input/output (I/O) controller 1304, a storage device 1306 such as a solid state drive (SSD) or a dual inline memory module (DIMM), and system memory device 1307. During operation, data may be transferred between a storage device 1306 and/or system memory device 1307 and the CPU 1302. In various embodiments, particular memory access operations (e.g., read and write operations) involving a storage device 1306 or system memory device 1307 may be issued by an operating system and/or other software applications executed by processor 1308.

CPU 1302 comprises a processor 1308, such as a microprocessor, an embedded processor, a digital signal processor (DSP), a network processor, a handheld processor, an application processor, a co-processor, an SOC, or other device to execute code (e.g., software instructions). Processor 1308, in the depicted embodiment, includes two processing elements (cores 1314A and 1314B in the depicted embodiment), which may include asymmetric processing elements or symmetric processing elements. However, a processor may include any number of processing elements that may be symmetric or asymmetric. CPU 1302 may be referred to herein as a host computing device (though a host computing device may be any suitable computing device operable to issue memory access commands to a storage device 1306).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 1314 (e.g., 1314A or 1314B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

In some embodiments, processor 1308 may comprise a processor unit, such as a processor core, graphics processing unit, hardware accelerator, field programmable gate array, neural network processing unit, artificial intelligence processing unit, inference engine, data processing unit, or infrastructure processing unit.

I/O controller 1310 is an integrated I/O controller that includes logic for communicating data between CPU 1302 and I/O devices. In other embodiments, the I/O controller 1310 may be on a different chip from the CPU 1302. I/O devices may refer to any suitable devices capable of transferring data to and/or receiving data from an electronic system, such as CPU 1302. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 1306 coupled to the CPU 1302 through I/O controller 1310.

An I/O device may communicate with the I/O controller 1310 of the CPU 1302 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 1310 and an associated I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 1310 may be located off-chip (e.g., not on the same chip as CPU 1302) or may be integrated on the same chip as the CPU 1302.

CPU memory controller 1312 is an integrated memory controller that controls the flow of data going to and from one or more system memory devices 1307. CPU memory controller 1312 may include logic operable to read from a system memory device 1307, write to a system memory device 1307, or to request other operations from a system memory device 1307. In various embodiments, CPU memory controller 1312 may receive write requests from cores 1314 and/or I/O controller 1310 and may provide data specified in these requests to a system memory device 1307 for storage therein. CPU memory controller 1312 may also read data from a system memory device 1307 and provide the read data to I/O controller 1310 or a core 1314. During operation, CPU memory controller 1312 may issue commands including one or more addresses of the system memory device 1307 in order to read data from or write data to memory (or to perform other operations). In some embodiments, CPU memory controller 1312 may be implemented on the same chip as CPU 1302, whereas in other embodiments, CPU memory controller 1312 may be implemented on a different chip than that of CPU 1302. I/O controller 1310 may perform similar operations with respect to one or more storage devices 1306.

The CPU 1302 may also be coupled to one or more other I/O devices through external I/O controller 1304. In a particular embodiment, external I/O controller 1304 may couple a storage device 1306 to the CPU 1302. External I/O controller 1304 may include logic to manage the flow of data between one or more CPUs 1302 and I/O devices. In particular embodiments, external I/O controller 1304 is located on a motherboard along with the CPU 1302. The external I/O controller 1304 may exchange information with components of CPU 1302 using point-to-point or other interfaces.

A system memory device 1307 may store any suitable data, such as data used by processor 1308 to provide the functionality of computer system 1300. For example, data associated with programs that are executed or files accessed by cores 1314 may be stored in system memory device 1307. Thus, a system memory device 1307 may include a system memory that stores data and/or sequences of instructions that are executed or otherwise used by the cores 1314. In various embodiments, a system memory device 1307 may store temporary data, persistent data (e.g., a user's files or instruction sequences) that maintains its state even after power to the system memory device 1307 is removed, or a combination thereof. A system memory device 1307 may be dedicated to a particular CPU 1302 or shared with other devices (e.g., one or more other processors or other devices) of computer system 1300.

In various embodiments, a system memory device 1307 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 1306 may store any suitable data, such as data used by processor 1308 to provide functionality of computer system 1300. For example, data associated with programs that are executed or files accessed by cores 1314A and 1314B may be stored in storage device 1306. Thus, in some embodiments, a storage device 1306 may store data and/or sequences of instructions that are executed or otherwise used by the cores 1314A and 1314B. In various embodiments, a storage device 1306 may store persistent data (e.g., a user's files or software application code) that maintains its state even after power to the storage device 1306 is removed. A storage device 1306 may be dedicated to CPU 1302 or shared with other devices (e.g., another CPU or other device) of computer system 1300.

In various embodiments, storage device 1306 may comprise a disk drive (e.g., a solid state drive); a memory card; a Universal Serial Bus (USB) drive; a Dual In-line Memory Module (DIMM), such as a Non-Volatile DIMM (NVDIMM); storage integrated within a device such as a smartphone, camera, or media player; or other suitable mass storage device.

In a particular embodiment, a semiconductor chip may be embodied in a semiconductor package. In various embodiments, a semiconductor package may comprise a casing comprising one or more semiconductor chips (also referred to as dies). A package may also comprise contact pins or leads used to connect to external circuits.

In some embodiments, all or some of the elements of system 1300 are resident on (or coupled to) the same circuit board (e.g., a motherboard). In various embodiments, any suitable partitioning between the elements may exist. For example, the elements depicted in CPU 1302 may be located on a single die (e.g., on-chip) or package or any of the elements of CPU 1302 may be located off-chip or off-package. Similarly, the elements depicted in storage device 1306 may be located on a single chip or on multiple chips. In various embodiments, a storage device 1306 and a computing host (e.g., CPU 1302) may be located on the same circuit board or on the same device and in other embodiments the storage device 1306 and the computing host may be located on different circuit boards or devices.

The components of system 1300 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 1300, such as cores 1314, one or more CPU memory controllers 1312, I/O controller 1310, integrated I/O devices, direct memory access (DMA) logic (not shown), etc. In various embodiments, components of computer system 1300 may be coupled together through one or more networks comprising any number of intervening network nodes, such as routers, switches, or other computing devices. For example, a computing host (e.g., CPU 1302) and the storage device 1306 may be communicably coupled through a network.

Although not depicted, system 1300 may use a battery and/or power supply outlet connector and associated system to receive power, a display to output data provided by CPU 1302, or a network interface allowing the CPU 1302 to communicate over a network. In various embodiments, the battery, power supply outlet connector, display, and/or network interface may be communicatively coupled to CPU 1302. Other sources of power can be used such as renewable energy (e.g., solar power or motion based power).

Referring now to FIG. 14, a block diagram of components present in a computer system that may function as either a host device or a peripheral device (or which may include both a host device and one or more peripheral devices) in accordance with certain embodiments is described. As shown in FIG. 14, system 1400 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 14 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 14, a processor 1410, in one embodiment, includes a microprocessor, multi-core processor, multi-threaded processor, an ultra-low voltage processor, an embedded processor, or other known processing element. In the illustrated implementation, processor 1410 acts as a main processing unit and central hub for communication with many of the various components of the system 1400. As one example, processor 1410 is implemented as a system on a chip (SoC). As a specific illustrative example, processor 1410 includes an Intel® Architecture Core™-based processor such as an i3, i5, i7 or another such processor available from Intel Corporation, Santa Clara, CA However, other low power processors such as those available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 1410 in one implementation will be discussed further below to provide an illustrative example.

Processor 1410, in one embodiment, communicates with a system memory 1415. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDWIMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD. However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1400. Specifically shown in the embodiment of FIG. 14 is a display 1424 which may be a high definition LCD or LED panel configured within a lid portion of the chassis. This display panel may also provide for a touch screen 1425, e.g., adapted externally over the display panel such that via a user's interaction with this touch screen, user inputs can be provided to the system to enable desired operations, e.g., with regard to the display of information, accessing of information and so forth. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I2C interconnect. As further shown in FIG. 14, in addition to touch screen 1425, user input by way of touch can also occur via a touch pad 1430 which may be configured within the chassis and may also be coupled to the same I2C interconnect as touch screen 1425.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited I/O interference when using multi-touch.

For perceptual computing and other purposes, various sensors may be present within the system and may be coupled to processor 1410 in different manners. Certain inertial and environmental sensors may couple to processor 1410 through a sensor hub 1440, e.g., via an I2C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example, with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 14, various peripheral devices may couple to processor 1410. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a near field communication (NFC) unit 1445 which may communicate, in one embodiment with processor 1410 via an SMBus. Note that via this NFC unit 1445, devices in close proximity to each other can communicate. For example, a user can enable system 1400 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 14, additional wireless units can include other short range wireless engines including a WLAN unit 1450 and a Bluetooth unit 1452. Using WLAN unit 1450, Wi-Fi™ communications in accordance with a given Institute of Electrical and Electronics Engineers (IEEE) 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter).

An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1410 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Turning next to FIG. 15, another block diagram for an example computing system that may serve as a host device or peripheral device (or may include both a host device and one or more peripheral devices) in accordance with certain embodiments is shown. As a specific illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 1500 includes 2 cores—1506 and 1507. Similar to the discussion above, cores 1506 and 1507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1512 includes an on-chip interconnect, such as an IOSF, AMBA, or other interconnect discussed above, which potentially implements one or more aspects of the described disclosure.

Interconnect 1512 provides communication channels to the other components, such as a Subscriber Identity Module (SIM) 1530 to interface with a SIM card, a boot rom 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the disclosure described herein.

In addition, the system illustrates peripherals for communication, such as a Bluetooth module 1570, 3G modem 1575, GPS 1580, and WiFi 1585. Note as stated above, a UE includes a radio for communication. As a result, these peripheral communication modules are not all required. However, in a UE some form of a radio for external communication is to be included.

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and handheld PCs. Embedded applications may include, e.g., a microcontroller, a digital signal processor (DSP), an SOC, a network computer (NetPC), a set-top box, a network hub, a wide area network (WAN) switch, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGS. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components of the FIGS., subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM;
magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes a system comprising transmission circuitry to communicate first data to receiver circuitry over a serial communication link during an active state of the serial communication link; and power adjustment circuitry to adjust a power level of the transmission circuitry responsive to a request based on at least one margin measurement performed by the receiver circuitry on the first data, wherein the transmission circuitry is to communicate second data using the adjusted power level over the serial communication link.

Example 2 includes the subject matter of Example 1, and wherein the power adjustment circuitry is to adjust the power level of the transmission circuitry by adjusting a swing voltage of the transmission circuitry.

Example 3 includes the subject matter of any of Examples 1 and 2, and wherein the power adjustment circuitry is to adjust the power level of the transmission circuitry by adjusting an output impedance of the transmission circuitry.

Example 4 includes the subject matter of any of Examples 1-3, and wherein the at least one margin measurement comprises a voltage margin measurement.

Example 5 includes the subject matter of any of Examples 1-4, and wherein the at least one margin measurement comprises a timing margin measurement.

Example 6 includes the subject matter of any of Examples 1-5, and wherein the power adjustment circuitry is to iteratively make a plurality of further adjustments to the power level of the transmission circuitry based on a plurality of margin measurements performed by the receiver circuitry during the active state of the serial communication link.

Example 7 includes the subject matter of any of Examples 1-6, and wherein the request is further based on an expected impact to power usage of the receiver circuitry by adjusting the power level of the transmission circuitry.

Example 8 includes the subject matter of any of Examples 1-7, and wherein the system comprises a host computing device comprising the transmission circuitry; and second receiver circuitry to perform at least one margin measurement on data received from second transmission circuitry of a peripheral device comprising the receiver circuitry for use in adjusting a power level of the second transmission circuitry.

Example 9 includes the subject matter of any of Examples 1-8, and further including a processor to generate the first data and the second data.

Example 10 includes the subject matter of any of Examples, 1-9, and further comprising a battery communicatively coupled to the processor, a display communicatively coupled to the processor, or a network interface communicatively coupled to the processor.

Example 11 includes an apparatus comprising first circuitry to request at least one margin measurement by receiver circuitry on first data communicated by transmission circuitry to receiver circuitry over a serial communication link during an active state of the serial communication link; and second circuitry to request adjustment of a power level of the transmission circuitry based on the at least one margin measurement.

Example 12 includes the subject matter of Example 11, and wherein the second circuitry is to determine whether to request adjustment of the power level of the transmission circuitry based on whether the adjustment would result in a lower overall power usage of the transmission circuitry and the receiver circuitry.

Example 13 includes the subject matter of any of Examples 11 and 12, and wherein the second circuitry is to determine whether to request adjustment of the power level of the transmission circuitry based on whether the adjustment to the power level of the transmission circuitry would cause a change in a mode of operation of the receiver circuitry.

Example 14 includes the subject matter of any of Examples 11-13, and wherein the second circuitry is to synchronize the adjustment of the power level of the transmission circuitry between the transmission circuitry and the receiver circuitry.

Example 15 includes the subject matter of any of Examples 11-14, and wherein the second circuitry is to iteratively request adjustments to the power level of the transmission circuitry based on a plurality of margin measurements performed by the receiver circuitry during the active state of the serial communication link.

Example 16 includes the subject matter of any of Examples 11-15, and wherein the power level is adjusted by adjusting a swing voltage of the transmission circuitry.

Example 17 includes the subject matter of any of Examples 11-16, and wherein the power level is adjusted by adjusting an output impedance of the transmission circuitry.

Example 18 includes the subject matter of any of Examples 11-17, and wherein the at least one margin measurement comprises a voltage margin measurement.

Example 19 includes the subject matter of any of Examples 11-18, and wherein the at least one margin measurement comprises a timing margin measurement.

Example 20 includes the subject matter of any of Examples 11-19, wherein the adjustment request is further based on an expected impact to power usage of the receiver circuitry by adjusting the power level of the transmission circuitry.

Example 21 includes one or more computer-readable media with code stored thereon, wherein the code is executable to cause a machine to request at least one margin measurement by receiver circuitry on first data communicated by transmission circuitry to receiver circuitry over a serial communication link during an active state of the serial communication link; and request adjustment of a power level of the transmission circuitry based on the at least one margin measurement.

Example 22 includes the subject matter of Example 21, and wherein the code is executable to cause the machine to determine whether to request adjustment of the power level of the transmission circuitry based on whether the adjustment would result in a lower overall power usage of the transmission circuitry and the receiver circuitry.

Example 23 includes the subject matter of any of Examples 21 and 22, and wherein the code is executable to cause the machine to determine whether to request adjustment of the power level of the transmission circuitry based on whether the adjustment to the power level of the transmission circuitry would cause a change in a mode of operation of the receiver circuitry.

Example 24 includes the subject matter of any of Examples 21-23, and wherein the code is executable to cause the machine to synchronize the adjustment of the power level of the transmission circuitry between the transmission circuitry and the receiver circuitry.

Example 25 includes the subject matter of any of Examples 21-24, and wherein the code is executable to cause the machine to iteratively request adjustments to the power level of the transmission circuitry based on a plurality of margin measurements performed by the receiver circuitry during the active state of the serial communication link.

Example 26 includes the subject matter of any of Examples 21-25, and wherein the power level is adjusted by adjusting a swing voltage of the transmission circuitry.

Example 27 includes the subject matter of any of Examples 21-26, and wherein the power level is adjusted by adjusting an output impedance of the transmission circuitry.

Example 28 includes the subject matter of any of Examples 21-27, and wherein the at least one margin measurement comprises a voltage margin measurement.

Example 29 includes the subject matter of any of Examples 21-28, and wherein the at least one margin measurement comprises a timing margin measurement.

What is claimed is:

1. A system comprising:
   transmission circuitry to communicate first data to receiver circuitry over a serial communication link during an active state of the serial communication link; and
   power adjustment circuitry to adjust a power level of the transmission circuitry responsive to a request based on at least one margin measurement performed by the receiver circuitry on the first data, wherein the transmission circuitry is to communicate second data using the adjusted power level over the serial communication link, wherein, responsive to receiving the at least one margin measurement, the power adjustment circuitry is to determine, based on an expected change of power in the receiver circuitry, that overall power used to communicate over the serial communication link will be improved through adjusting the power level of the transmission circuitry.

2. The system of claim 1, wherein the power adjustment circuitry is to adjust the power level of the transmission circuitry by adjusting both a swing voltage and an output impedance of the transmission circuitry based on the at least one margin measurement performed by the receiver circuitry on the first data.

3. The system of claim 1, wherein the receiver comprises a duplicated data path that includes a first sampler to sample the first data and a second sampler to perform the at least one margin measurement using non-destructive margining.

4. The system of claim 1, wherein the expected change of power in the receiver is based on additional circuitry of the receiver circuitry that is to be turned on responsive to the adjusting of the power level of the transmission circuitry.

5. The system of claim 1, wherein the power adjustment circuitry is to specify a time for adjustment of the power level of the transmission circuitry and to communicate the time to the transmission circuitry and the receiver circuitry.

6. The system of claim 1, wherein the power adjustment circuitry is to iteratively make a plurality of further adjustments to the power level of the transmission circuitry based on a plurality of margin measurements performed by the receiver circuitry during the active state of the serial communication link.

7. The system of claim 6, wherein during one iteration of transmission circuitry power level adjustment, an amount of power adjustment is proportional to a difference in a measured margin with respect to a target margin level, wherein the measured margin is based on the at least one margin measurement.

8. The system of claim 1, wherein the system comprises:
a host computing device comprising:
the transmission circuitry; and
second receiver circuitry to perform at least one margin measurement on data received from second transmission circuitry of a peripheral device comprising the receiver circuitry for use in adjusting a power level of the second transmission circuitry.

9. The system of claim 1, further comprising a processor to generate the first data and the second data.

10. The system of claim 9, further comprising a battery communicatively coupled to the processor, a display communicatively coupled to the processor, or a network interface communicatively coupled to the processor.

11. An apparatus comprising:
first circuitry to request at least one margin measurement by receiver circuitry on first data communicated by transmission circuitry to receiver circuitry over a serial communication link during an active state of the serial communication link; and
second circuitry to request adjustment of a power level of the transmission circuitry based on the at least one margin measurement, wherein, responsive to the at least one margin measurement, the second circuitry is to determine, based on an expected change of power in the receiver circuitry, that overall power used to communicate over the serial communication link will be improved through adjusting the power level of the transmission circuitry.

12. The apparatus of claim 11, wherein the second circuitry is to determine whether to request adjustment of the power level of the transmission circuitry based on whether the adjustment would result in a lower overall power usage of the transmission circuitry and the receiver circuitry.

13. The apparatus of claim 11, wherein the second circuitry is to determine whether to request adjustment of the power level of the transmission circuitry based on whether the adjustment to the power level of the transmission circuitry would cause a change in a mode of operation of the receiver circuitry.

14. The apparatus of claim 11, wherein the second circuitry is to synchronize the adjustment of the power level of the transmission circuitry between the transmission circuitry and the receiver circuitry.

15. The apparatus of claim 11, wherein the second circuitry is to iteratively request adjustments to the power level of the transmission circuitry based on a plurality of margin measurements performed by the receiver circuitry during the active state of the serial communication link.

16. One or more non-transitory computer-readable media with code stored thereon, wherein the code is executable to cause a machine to:
request at least one margin measurement by receiver circuitry on first data communicated by transmission circuitry to receiver circuitry over a serial communication link during an active state of the serial communication link;
responsive to the at least one margin measurement, determine, based on an expected change of power in the receiver circuitry, that overall power used to communicate over the serial communication link will be improved through adjusting a power level of the transmission circuitry; and
request adjustment of the power level of the transmission circuitry based on the at least one margin measurement.

17. The one or more non-transitory computer-readable media of claim 16, wherein the code is executable to cause the machine to determine whether to request adjustment of the power level of the transmission circuitry based on whether the adjustment would result in a lower overall power usage of the transmission circuitry and the receiver circuitry.

18. The one or more non-transitory computer-readable media of claim 16, wherein the code is executable to cause the machine to determine whether to request adjustment of the power level of the transmission circuitry based on whether the adjustment to the power level of the transmission circuitry would cause a change in a mode of operation of the receiver circuitry.

19. The one or more non-transitory computer-readable media of claim 16, wherein the code is executable to cause the machine to synchronize the adjustment of the power level of the transmission circuitry between the transmission circuitry and the receiver circuitry.

20. The one or more non-transitory computer-readable media of claim 16, wherein the code is executable to cause the machine to iteratively request adjustments to the power level of the transmission circuitry based on a plurality of margin measurements performed by the receiver circuitry during the active state of the serial communication link.

* * * * *